United States Patent
Stroud

(10) Patent No.: US 7,017,605 B2
(45) Date of Patent: Mar. 28, 2006

(54) VALVE ASSEMBLY

(75) Inventor: Donald R. Stroud, Lafayette, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 10/456,724

(22) Filed: Jun. 6, 2003

(65) Prior Publication Data

US 2004/0244838 A1    Dec. 9, 2004

(51) Int. Cl.
    *F16K 31/383*    (2006.01)
(52) U.S. Cl. .............. 137/490; 137/115.23; 137/454.5; 251/360
(58) Field of Classification Search ........... 137/115.13, 137/115.23, 454.4, 454.5, 490; 251/337, 251/359, 360
    See application file for complete search history.

(56) References Cited

U.S. PATENT DOCUMENTS

| | | | |
|---|---|---|---|
| 2,587,161 A * | 2/1952 | Huber | 137/490 |
| 3,608,580 A * | 9/1971 | Hohmann et al. | 137/490 |
| 4,248,265 A | 2/1981 | Freeman, Jr. | |
| 4,768,605 A | 9/1988 | Miller et al. | |
| 4,811,756 A * | 3/1989 | Hall | 137/498 |
| 5,170,818 A * | 12/1992 | Hatzikazakis | 137/469 |
| 5,378,118 A | 1/1995 | Phillips | |
| 5,460,198 A * | 10/1995 | Kortge | 137/116.3 |
| 5,496,155 A | 3/1996 | Noah et al. | |
| 5,613,516 A * | 3/1997 | Landrum | 137/509 |
| 6,182,363 B1 | 2/2001 | Venable | |
| 6,209,577 B1 | 4/2001 | Lai et al. | |

* cited by examiner

*Primary Examiner*—Ramesh Krishnamurthy
(74) *Attorney, Agent, or Firm*—Tarolli, Sundheim, Covell & Tummino L.L.P.

(57) ABSTRACT

A valve assembly (112) includes a first member (120) having a cavity (136). A poppet (142) is located in the cavity (136) in the first member (120). The poppet (142) is axially movable relative to the first member (120) within the cavity (136). A poppet seat (138) has a passage (148) for conducting fluid toward the cavity (136). The poppet seat (138) engages the first member (120) and extends axially into the cavity (136) in the first member. The poppet seat (138) is axially movable relative to the first member (120). The poppet (142) is biased into engagement with the poppet seat (138) to close the passage (148) in the poppet seat. A locking member (172) engages the poppet seat (138) and the first member (120) to fix the poppet seat to the first member in any one of a plurality of axial positions relative to the first member.

3 Claims, 2 Drawing Sheets

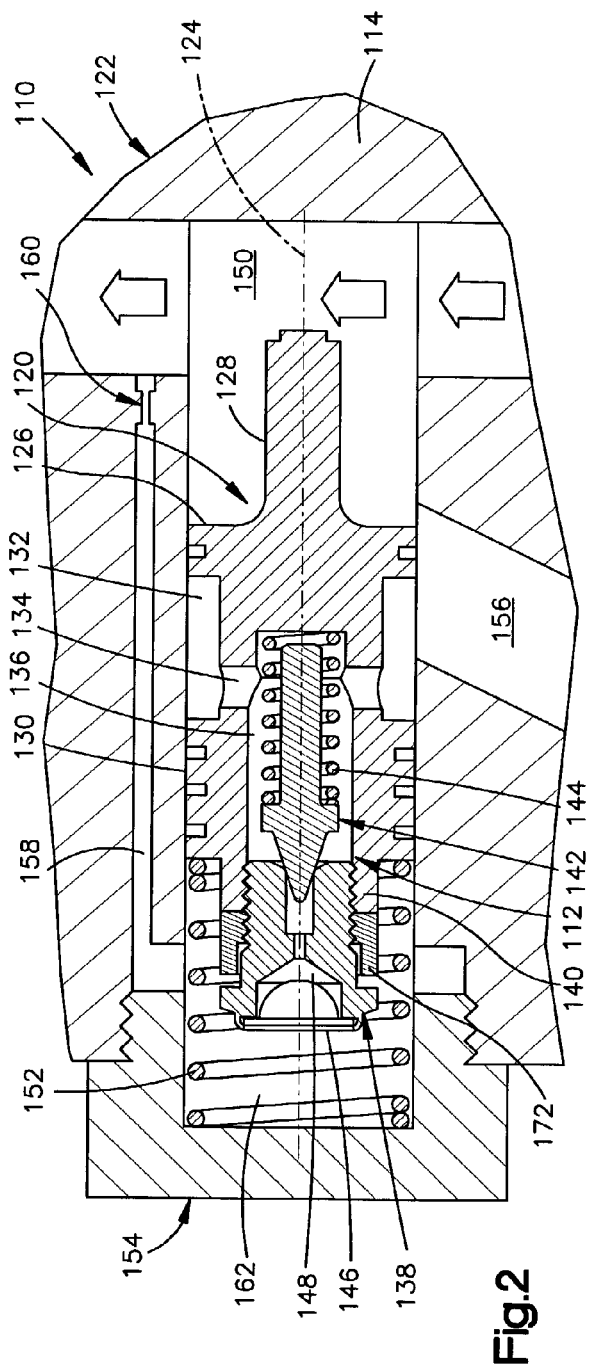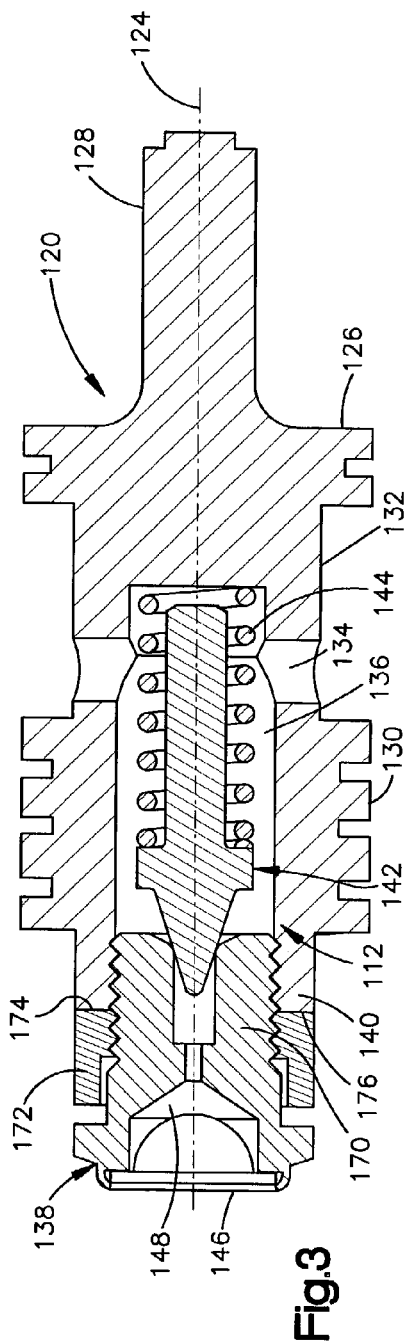

VALVE ASSEMBLY

FIELD OF THE INVENTION

The present invention relates to a valve assembly for controlling pressure in a fluid system, particularly a fluid power assist steering system.

BACKGROUND OF THE INVENTION

A known fluid power assist steering system includes a pump for pumping hydraulic fluid to a fluid power assist steering gear. The output pressure demands on the pump can vary with the pump flow and system load restriction. This pressure must be limited to a predetermined maximum in order to protect the pump and other system components from damage. To this end, the pump contains a relief valve.

The relief valve includes a movable spring-biased spool that contains an internal poppet valve assembly. The spool normally covers a fluid pressure relief port. The spool on one side is exposed to the output pressure of the pump. Output pressure is also communicated through an orifice to the opposite side of the spool. The spool contains a venting passage in communication with the opposite side of the spool. The venting passage is normally blocked by the poppet valve assembly. When the output pressure of the pump exceeds a predetermined maximum amount, the poppet valve assembly opens to exhaust fluid through the vent passage to the pressure relief port. The reduced pressure on the opposite side of the spool allows the spool to move and open the pressure relief port, thereby relieving the output pressure.

The prior art poppet valve assembly includes a poppet spring that biases a poppet against a poppet seat. The force applied by the poppet spring determines the pressure at which the poppet valve assembly opens. The force applied by the poppet spring is determined by assembling the poppet valve assembly using shims to set the initial position of the poppet seat and, thus, the force applied by the poppet spring. Determining the correct number of shims to use in a particular poppet valve assembly is a time consuming and labor intensive process.

SUMMARY OF THE INVENTION

The present invention is a valve assembly including a first member or spool having a cavity. A poppet is located in the cavity in the first member. The poppet is axially movable relative to the first member within the cavity. A poppet seat has a passage for conducting fluid toward the cavity. The poppet seat engages the first member and extends axially into the cavity in the first member. The poppet seat is axially movable relative to the first member. The poppet is biased into engagement with the poppet seat to close the passage in the poppet seat. A locking member engages the poppet seat and the first member to fix the poppet seat to the first member in any one of a plurality of axial positions relative to the first member.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 2 is a schematic illustration, similar to FIG. 1, of a relief valve including a poppet valve assembly constructed in accordance with the present invention; and FIG. 3 is a schematic illustration of portions of the relief valve of FIG. 2.

DESCRIPTION OF THE INVENTION

Figure 1:
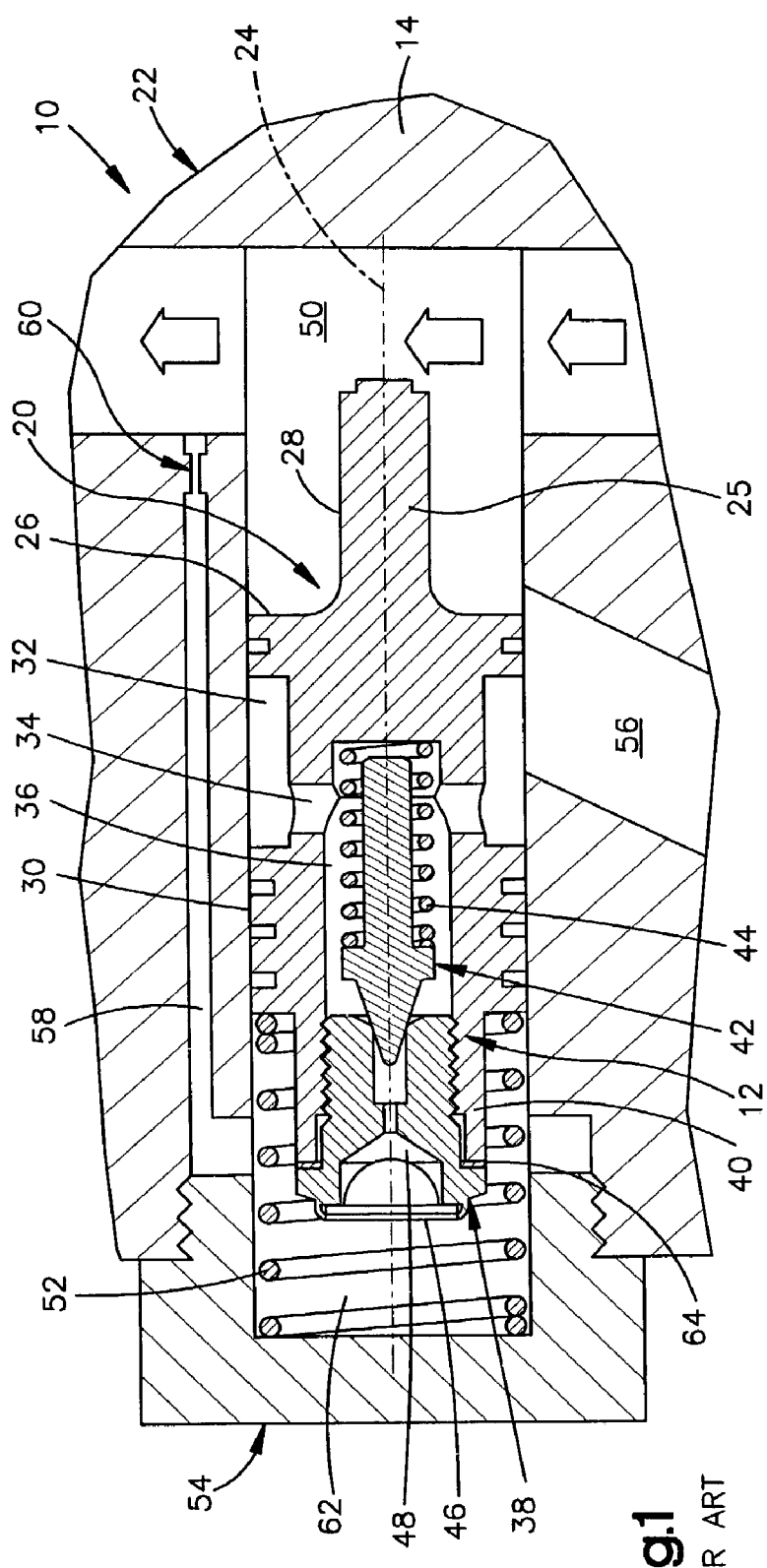
FIG. 1 is a schematic illustration of a prior art relief valve including a poppet valve assembly.

FIG. 1 is a schematic illustration of a prior art relief valve 10 including a poppet valve assembly 12. The relief valve 10 is included in a pump 14 (the other parts of which are not shown) for a hydraulic fluid power assist steering system. The relief valve 10 includes a spool 20 movable in a housing 22 along a longitudinal axis 24. The spool 20 has a first land 26. A narrow diameter rod portion 28 of the spool 20 projects axially from the land 26. A second land 30 is located centrally on the spool 20. Between the lands 26 and 30 is a groove 32. One or more vent passages 34 extend radially inward from the groove 32 to a central cavity 36 in the spool 20.

A poppet seat 38 is screwed into an end portion 40 of the spool 20 opposite from the rod portion 28. A poppet 42 is disposed in the central cavity 36 in the spool 20. The poppet 42 is biased into engagement with the poppet seat 38 by a poppet spring 44. A wire screen 46 covers a passage 48 in the poppet seat 38 that communicates fluid pressure toward the cavity 36.

The rod portion 28 of the spool 20 is located in an outlet passage 50 in the pump 14 that is exposed to output pressure of the pump. The output pressure acts on the spool 20 against the biasing force of a spring 52. The spring 52 acts between the spool 20 and a seat 54 of the housing 14. The first land 26 on the spool 20 is disposed between the passage 50 and a re-circulation or pressure relief port 56. The output pressure is also communicated through a conduit 58 containing a flow-restricting orifice 60 to a spool-spring cavity 62 and then to the passage 48 in the poppet seat 38.

Prior to operation of the pump, the spring 52 biases the spool 20 to the right in FIG. 1 to a position (not shown) where land 26 blocks fluid flow from the outlet passage 50 to the re-circulation port 56. As the pump begins operating, pressure in outlet 50 increases and acts on the spool 20 against the bias of spring 52 and the pressure in spool-spring cavity 62. The spool 20 moves to a position such as shown in FIG. 1 where re-circulation port 56 is in communication with outlet passage 50 and some fluid flows from the outlet port 50 to the re-circulation port 56 and by passes (does not flow to the system such as a power steering system supplied by the pump). This protects the steering system from excessive flow, as is known.

The pressure in the passage 50 is communicated through the conduit 58 and orifice 60 to the spool-spring cavity 62 and then to the passage 48 in the poppet seat 38. The fluid pressure acts against the poppet 42. When the fluid pressure exceeds a predetermined high pressure the poppet 42 moves off the poppet seat 38, against the biasing force of the poppet spring 44. Fluid flows through the passage 48 in the poppet seat 38, through the spool 20, and out the vent passages 34 to the pressure relief port 56 and thereby to the pump inlet. The pressure in the spool-spring cavity 62 is reduced. The spool 20 moves against the spring 52 and the pressure relief port 56 communicates to a greater extent with outlet 50. The output pressure in the passage 50 is thus reduced providing pressure relief.

The prior art relief valve 10 is assembled by first inserting the poppet spring 44 and the poppet 42 into the central cavity 36 in the spool 20. The poppet seat 38 is then screwed into the spool 20 until it engages the poppet 42. Further movement of the poppet seat 38 into the cavity 36 in the spool 20 compresses the poppet spring 44. The amount of compression of the poppet spring 44 determines how much fluid pressure is needed to open the poppet valve assembly 12.

The amount of compression of the poppet spring 44 is set by how far the poppet seat 38 is screwed into the cavity 36 in the spool 20. The distance that the poppet seat 38 is screwed into the spool 20 is determined by the placement of one or more shims 64 between the spool 20 and the poppet seat during assembly of the relief valve 10. Depending on the parts tolerances and the compressive force of the particular poppet spring 44, different sizes and numbers of shims 64 may be needed for different poppet valve assemblies 12. The appropriate size and number of shims 64 for each particular poppet valve assembly 12 must be determined on an ad hoc, or piece-by-piece, basis.

In accordance with the present invention, a relief valve 110 (FIG. 2) includes a poppet valve assembly 112. The relief valve 110 is included in a pump 114 (the other parts of which are not shown) for a hydraulic fluid power assist steering system. The relief valve 110 includes a first member or spool 120 movable in a housing 122 along a longitudinal axis 124. The spool 120 (FIGS. 2 and 3) has a first land 126. A narrow diameter rod portion 128 of the spool 120 projects axially from the land 126. A second land 130 is located centrally on the spool 120. Between the lands 126 and 130 is a groove 132. One or more vent passages 134 extend radially inward from the groove 132 to a central cavity 136 in the spool 120.

A poppet seat 138 is screwed into an end portion 140 of the spool 120 opposite from the rod portion 128. A poppet 142 is disposed in the central cavity 136 in the spool 120. The poppet 142 is biased into engagement with the poppet seat 138 by a poppet spring 144. A wire screen 146 covers a passage 148 in the poppet seat 138 that communicates fluid pressure toward the cavity 136.

The rod portion 128 (FIG. 2) of the spool 120 is located in an outlet passage 150 in the pump 114 that is exposed to output pressure of the pump. A spring 152 acts between the spool 120 and a seat 154 of the housing 114. The first land 126 on the spool 120 is disposed between the passage 150 and a re-circulation or pressure relief port 156. The output pressure is also communicated through a conduit 158 containing a flow-restricting orifice 160 to a spool-spring cavity 162 and then to the passage 148 in the poppet seat 138. The output pressure acts on the spool 120 against the biasing force of the spring 152 and the pressure in cavity 162.

When the pressure in passage 150 exceeds a predetermined pressure, the pressure is communicated through the conduit 158 and the orifice 160 to the spool-spring cavity 162 and then to the opening 148 in the poppet seat 138. The fluid pressure acts against the poppet 142. The poppet 142 moves off the poppet seat 138, against the biasing force of the poppet spring 144. Fluid flows through the passage 148 in the poppet seat 138 and into the cavity 136. Fluid flows from the cavity 136 out the vent passages 134 to the pressure relief port 156 and thereby to the pump inlet. The pressure in the spool-spring cavity 162 is reduced. The spool 120 moves against the spring 152 and the pressure relief port 156 opens. The output pressure of the pump 114 is thus reduced to a desired predetermined pressure at which the poppet 142 moves against the poppet seat 138.

The poppet seat 138 (FIG. 3) has a threaded portion 170 threadably engaging the end portion 140 of the spool 120. A locking member or jam-nut 172 threadably engages the threaded portion 170 of the poppet seat 138. The locking member 172 has an axial end surface 174 that engages an axial end surface 176 of the spool 120. The locking member 172 fixes the poppet seat 138 to the spool 120 in any one of a plurality of axial positions relative to the spool 120.

The relief valve 110 is assembled by first inserting the poppet spring 144 and the poppet 142 into the central cavity 136 in the spool 120. The poppet seat 138, with the locking member 172 thereon, is then axially screwed into the spool 120 until it engages the poppet 142. Further axial movement of the poppet seat 138 into the cavity 136 in the spool 120 compresses the poppet spring 144. The amount of compression of the poppet spring 144 determines how much fluid pressure is needed to open the poppet valve assembly 112.

The amount of compression of the poppet spring 144 is set by how far the poppet seat 138 is screwed into the cavity 136 in the spool 120. Once the poppet seat 138 is screwed into the spool 120 a desired distance which will provide a predetermined fluid pressure to open the poppet valve assembly 112, the locking member 172 is threaded into engagement with the spool 120. When the locking member 172 is threaded into engagement with the spool 120, the poppet seat 138 is fixed in the desired axial position relative to the spool. Accordingly, the poppet seat 138 has an infinite number of axial positions relative to the spool 120.

The process of positioning the poppet seat 138 relative to the spool 120 may be automated on a test apparatus that measures the pressure needed to move the poppet 142 as the poppet seat is moved relative to the spool prior to threading the locking member 172 into engagement with the spool. Furthermore, the axial distance that the poppet seat 138 moves relative to the spool 120 is a function of the amount of rotation of the poppet seat relative to the spool. Accordingly, the poppet seat 138 can be moved a predetermined distance relative to the spool 120 by rotating the poppet seat a predetermined angle.

The relief valve assembly 110 functions in substantially the same manner as the prior art relief valve assembly 10. Pump output pressure in the passage 150 acts on the spool 120 to hold the spool in position against the biasing force of the spring 152 and pressure in cavity 162. When the output pressure of the pump 114 exceeds a predetermined amount, the pressure is communicated through the passage 158 to the spool-spring cavity 162 and then to the passage 148 in the poppet seat 138. The fluid pressure acts against the poppet 142. The poppet 142 moves off the poppet seat 138, against the biasing force of the spring 144. Fluid flows through the poppet seat 138 and the spool 120 and out the vent passages 134 to the pressure relief port 156. The pressure in the spring cavity 162 is reduced. The spool 120 moves against the spring 152 to open the pressure relief port 156. The pressure in the passage 150 is thus reduced to a desired predetermined pressure.

From the above description of the invention, those skilled in the art will perceive improvements, changes and modifications. Such improvements, changes and modifications within the skill of the art are intended to be covered by the appended claims.

The invention claimed is:

1. A combination pressure relief and flow control valve assembly for use with a pump, said combination pressure relief and flow control valve assembly comprising:

a housing having an outlet passage which is connected in fluid communication with the pump and through which fluid flows to a power steering system which is supplied by the pump, said housing having a recirculation port through which excess fluid flows to the pump, a valve spool disposed in a chamber in said housing, said valve spool having a first end portion which is disposed in a first end portion of said chamber in said housing and is exposed to fluid pressure in said outlet passage, said valve spool having a land which cooperates with said recirculation port to modulate fluid flow to said recirculation port, a poppet seat is exposed to fluid pressure in a second end portion of said chamber in said housing, said poppet seat has an external thread convolution which engages an internal thread convolution in a second end portion of said valve spool, said poppet seat cooperates with said valve spool to at least partially define a cavity in said valve spool, a poppet valve disposed in said cavity in said valve spool, a poppet valve spring disposed in said cavity in said valve spool to press an end portion of said poppet valve against said poppet seat to block fluid flow from said second end portion of said chamber in said housing through a passage in said poppet seat, a conduit at least partially disposed in said housing and connected in fluid communication with said outlet passage and with said second end portion of said chamber in said housing to conduct fluid pressure from said outlet passage to said second end portion of said chamber, said poppet valve being movable against the influence of said poppet valve spring from a closed condition blocking fluid flow from said second end portion of said chamber in said housing to an open condition in which said poppet valve is ineffective to block fluid flow from said second end portion of said chamber in said housing through said passage in said poppet seat into said cavity in said valve spool, a vent passage formed in said valve spool to enable fluid to flow from said cavity in said valve spool to said recirculation port in said housing, said poppet seat being movable relative to said valve spool to any one of a plurality of positions to vary and an extent of threaded engagement of said poppet seat with said valve spool and the force with which said poppet valve spring presses the end portion of said poppet valve against said poppet seat, a locking member having an internal thread convolution disposed in threaded engagement with said external thread convolution on said poppet seat, said locking member having an end surface which is disposed in engagement with an end surface on said valve spool to press the external thread convolution of said poppet seat against the internal thread convolution in said valve spool under the influence of force transmitted from said locking member to said valve spool.

2. A combination pressure relief and flow control valve assembly as set forth in claim 1 further including a valve spool spring disposed in said second end portion of said chamber, said valve spool spring being effective to urge said valve spool away from said second end portion of said chamber against the influence of fluid pressure applied to said first end portion of said valve spool by fluid pressure in said outlet passage.

3. A combination pressure relief and flow control valve assembly as set forth in claim 2 wherein at least a portion of said valve spool spring extends around said locking member.

\* \* \* \* \*